(12) United States Patent
Zheng et al.

(10) Patent No.: US 12,401,318 B2
(45) Date of Patent: Aug. 26, 2025

(54) MODULE AND SYSTEM FOR CONTROLLING PHOTOVOLTAIC STRINGS TO PERFORM DOMINO-TYPE AUTOMATIC SNOW MELTING

(71) Applicants: Institute of Advanced Technology, University of Science and Technology of China, Hefei (CN); UNIVERSITY OF SCIENCE AND TECHNOLOGY OF CHINA, Hefei (CN)

(72) Inventors: Jianan Zheng, Anhui (CN); Wen Liu, Anhui (CN); Jan Justus Ingenhoff, Anhui (CN); Wenjun Liu, Anhui (CN); Xinyu Zhang, Anhui (CN)

(73) Assignees: Institute of Advanced Technology, University of Science and Technology of China, Hefei (CN); UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 449 days.

(21) Appl. No.: 17/915,582

(22) PCT Filed: Nov. 8, 2019

(86) PCT No.: PCT/CN2019/116562
§ 371 (c)(1),
(2) Date: Sep. 29, 2022

(87) PCT Pub. No.: WO2020/248482
PCT Pub. Date: Dec. 17, 2020

(65) Prior Publication Data
US 2023/0344382 A1 Oct. 26, 2023

(30) Foreign Application Priority Data

Jun. 11, 2019 (CN) .......................... 201910499466.3

(51) Int. Cl.
*H02S 40/12* (2014.01)
*F24S 40/20* (2018.01)
(Continued)

(52) U.S. Cl.
CPC .............. *H02S 40/12* (2014.12); *F24S 40/20* (2018.05); *F24S 40/85* (2018.05); *H02S 40/44* (2014.12)

(58) Field of Classification Search
None
See application file for complete search history.

(56) References Cited

U.S. PATENT DOCUMENTS

2004/0165290 A1 8/2004 Muscat
2023/0344382 A1 10/2023 Zheng et al.

FOREIGN PATENT DOCUMENTS

CN 103227216 A 7/2013
CN 203260591 U 10/2013
(Continued)

OTHER PUBLICATIONS

Machine translation of JP2000-012886A (Year: 2000).*
(Continued)

*Primary Examiner* — Ryan S Cannon
(74) *Attorney, Agent, or Firm* — Westman, Champlin & Koehler, P.A.

(57) ABSTRACT

Provided is a system for controlling photovoltaic strings to perform Domino-type automatic snow melting, including a controller, M photovoltaic strings and a photovoltaic power supply control module; the $1^{st}$ to $(k-1)^{th}$ photovoltaic strings supply power to the $k^{th}$ photovoltaic string, in response to the $k^{th}$ photovoltaic string being in a load mode, $2 \leq k \leq M$. The M photovoltaic strings are correspondingly connected to M photovoltaic interfaces of the photovoltaic power supply control module; the controller is connected to the photovol-
(Continued)

taic power supply control module, and is configured to control the working state of the photovoltaic power supply control module.

8 Claims, 10 Drawing Sheets

(51) Int. Cl.
*F24S 40/80* (2018.01)
*H02S 40/44* (2014.01)

(56) References Cited

FOREIGN PATENT DOCUMENTS

| CN | 103381413 | A | | | 11/2013 | | |
|---|---|---|---|---|---|---|---|
| CN | 207369718 | U | | | 5/2018 | | |
| CN | 110138331 | A | * | 8/2019 | | ............ | H02S 40/12 |
| CN | 110212633 | A | | | 9/2019 | | |
| JP | 2000012886 | A | * | 1/2000 | | ............ | H02S 40/12 |
| JP | 2014029915 | A | * | 2/2014 | | | |
| JP | 6372467 | B2 | * | 8/2018 | | | |
| JP | 2021035181 | A | * | 3/2021 | | | |
| WO | 2020/248482 | A1 | | | 12/2020 | | |

OTHER PUBLICATIONS

Machine translation of CN110138331A (Year: 2019).*
Machine translation of JP2021-035181A (Year: 2021).*
Machine translation of JP2014-029915A (Year: 2014).*
Machine translation of JP6372467B2 (Year: 2018).*
International Search Report and Written Opinion from International Application No. PCT/CN2019/116562, dated Feb. 17, 2020.
Canadian Examination Report for Canadian Patent Application No. 3,174,373, dated Dec. 16, 2024, 4 pages.

* cited by examiner

MODULE AND SYSTEM FOR CONTROLLING PHOTOVOLTAIC STRINGS TO PERFORM DOMINO-TYPE AUTOMATIC SNOW MELTING

CROSS REFERENCE TO RELATED APPLICATIONS

This application is a Section 371 National Stage Application of International Application No. PCT/CN2019/116562, filed on Nov. 8, 2019, entitled "MODULE AND SYSTEM FOR CONTROLLING PHOTOVOLTAIC STRINGS TO PERFORM DOMINO-TYPE AUTOMATIC SNOW MELTING", which published as WIPO Publication No. 2020/248482, on Dec. 17, 2020, not in English, which claims priority to Chinese patent Application No. CN201910499466.3, filed on Jun. 11, 2019, the disclosures of which are incorporated herein by reference in their entireties.

TECHNICAL FIELD

The present disclosure relates to a field of photovoltaic technology, and in particular, to a module and a system for controlling photovoltaic strings to perform domino-type automatic snow melting.

BACKGROUND

Rooftop photovoltaic systems located in high latitude regions (such as Canada, Northern Europe, Northeast China) are in an environment where a daily average temperature is below zero for a long time in a year, and often have a problem that the system fails to generate electricity due to snow and ice. Traditional snow removal methods are usually composed of manually sweeping, using industrial salt or snow-melting agent. The manual snow removal method is not only time-consuming, labor-intensive and costly, but also contains safety risks of working on the rooftop. The using of industrial salt or snow-melting agent easily causes the corrosion damage to the structure of photovoltaic modules. Due to the above-mentioned problem, the power generation efficiency of the rooftop photovoltaic system is seriously reduced in snowy season, which affects the user's experience and limits a further popularization of the rooftop photovoltaic system.

SUMMARY

Based on the technical problem existing in the background, the present disclosure provides a module and a system for controlling photovoltaic strings to perform domino-type automatic snow melting.

A photovoltaic power supply control module provided in the present disclosure includes: M photovoltaic interfaces for connecting photovoltaic strings;
the photovoltaic power supply control module includes at least Work State I and Work State II:
in Work State I, the photovoltaic strings connected to $1^{st}$ to $M^{th}$ photovoltaic interfaces are all in a power supply mode, and supply power to an external load; and
in Work State II, the photovoltaic strings connected to $1^{st}$ to $(k-1)^{th}$ photovoltaic interfaces are all in the power supply mode in response to the photovoltaic string connected to a $k^{th}$ photovoltaic interface being in a load mode, and the photovoltaic strings connected to the $1^{st}$ to $(k-1)^{th}$ photovoltaic interfaces supply power to the photovoltaic string connected to the $k^{th}$ photovoltaic interface, $2 \leq k \leq M$.

Wherein, in Work State I, the photovoltaic strings connected to the $1^{st}$ to $M^{th}$ photovoltaic interfaces are connected in series; and in Work State II, the photovoltaic strings connected to the $1^{st}$ to $(k-1)^{th}$ photovoltaic interfaces are connected in series, in response to the photovoltaic string connected to the $k^{th}$ photovoltaic interface being in the load mode.

Wherein, the photovoltaic power supply control module further includes a power interface, wherein the power interface is configured to connect to a power supply; and in Work State II, the power supply connected to the power interface supplies power to the photovoltaic string connected to the $1^{st}$ photovoltaic interface, in response to the photovoltaic string connected to the $1^{st}$ photovoltaic interface being in the load mode.

Wherein, in Work State II, the power supply connected to the power interface and the photovoltaic strings connected to the $1^{st}$ to $(k-1)^{th}$ photovoltaic interfaces all supply power to the photovoltaic string connected to the $k^{th}$ photovoltaic interface, in response to the photovoltaic string connected to the $k^{th}$ photovoltaic interface being in the load mode, $2 \leq k \leq M$.

Wherein, there is provided a system for controlling photovoltaic strings to perform Domino-type automatic snow melting, including a controller, M photovoltaic strings and a photovoltaic power supply control module; wherein the photovoltaic power supply control module comprises M photovoltaic interfaces; the M photovoltaic strings are correspondingly connected to the M photovoltaic interfaces; wherein,
the photovoltaic power supply control module comprises at least Work State I and Work State II:
in Work State I, $1^{st}$ to $M^{th}$ photovoltaic strings are all in a power supply mode, and supply power to an external load;
in Work State II, $1^{st}$ to $(k-1)^{th}$ photovoltaic strings are all in a power supply mode in response to a $k^{th}$ photovoltaic string being in a load mode, and the $1^{st}$ to $(k-1)^{th}$ photovoltaic strings supply power to the $k^{th}$ photovoltaic string, $2 \leq k \leq M$; and
the controller is connected to the photovoltaic power supply control module, and is configured to control the working state of a photovoltaic power supply control module.

Wherein, in Work State I of the photovoltaic power supply control module, the $1^{st}$ to $M^{th}$ photovoltaic strings are connected in series; in Work State II of the photovoltaic power supply control module, the $1^{st}$ to $(k-1)^{th}$ photovoltaic strings are connected in series, in response to the photovoltaic string connected to the $k^{th}$ photovoltaic interface being in the load mode.

Wherein, in Work State II of the photovoltaic power supply control module, $2^{nd}$ to $M^{th}$ photovoltaic strings execute the load mode sequentially.

Wherein, the number of photovoltaic panels included in the $2^{nd}$ photovoltaic string to the $M^{th}$ photovoltaic string increase sequentially.

Wherein, a photovoltaic panel included in the $2^{nd}$ photovoltaic string to the $M^{th}$ photovoltaic string are all installed on the same inclined plane A.

Wherein, all photovoltaic panels on the inclined plane A are arranged in a matrix; and in a row of the photovoltaic panels in an inclined direction of the inclined plane A, a serial number of a photovoltaic string in which a photovoltaic panel is located lower is less than a serial number of a photovoltaic string in which a photovoltaic panel is located higher.

Wherein, a photovoltaic panel included in the $1^{st}$ photovoltaic string is installed vertically Wherein, the system further includes a power supply; wherein the power supply is connected to the photovoltaic power supply control module; in Work State II of the photovoltaic power supply control module, the power supply supplies power to the $1^{st}$ photovoltaic string, in response to the $1^{st}$ photovoltaic string being in the load mode.

Wherein, in Work State II of the photovoltaic power supply control module, the $1^{st}$ to $M^{th}$ photovoltaic strings execute the load mode sequentially.

Wherein, the power supply and the $1^{st}$ to $(k-1)^{th}$ photovoltaic strings all supply power to the $k^{th}$ photovoltaic string, in response to the $k^{th}$ photovoltaic string being in the load mode, $2 \leq k \leq M$.

Wherein, the number of photovoltaic panels included in the $1^{st}$ photovoltaic string to the $M^{th}$ photovoltaic string increase sequentially.

Wherein, a photovoltaic panel included in the $1^{st}$ photovoltaic string to the $M^{th}$ photovoltaic string are all installed on the same inclined plane A.

Wherein, all photovoltaic panels on the inclined plane A are arranged in a matrix; and in a row of photovoltaic panels in an inclined direction of the inclined plane, a serial number of a photovoltaic string in which a photovoltaic panel is located lower is less than a serial number of a photovoltaic string in which a photovoltaic panel is located higher.

DETAILED DESCRIPTION OF EMBODIMENTS

Figure 1:
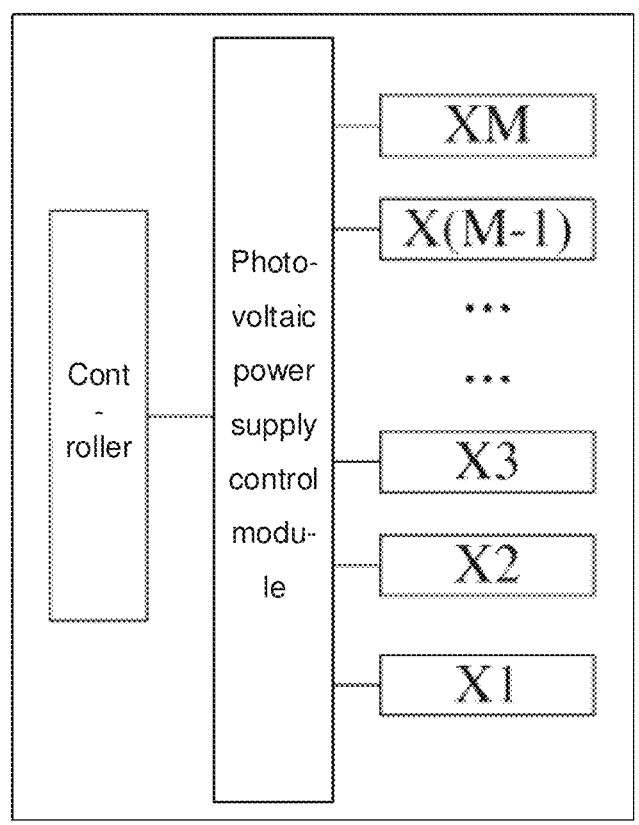
FIG. 1 shows a schematic diagram of a system for controlling photovoltaic strings to perform Domino-type automatic snow melting provided in Embodiment 3.

A photovoltaic string mentioned in the present disclosure includes one or more photovoltaic panels; when the photovoltaic string includes a plurality of photovoltaic panels, the photovoltaic string is a photovoltaic power supply whose power is the sum of the power of all photovoltaic panels. Specifically, when the photovoltaic string includes a plurality of photovoltaic panels, the photovoltaic panels are connected in series and/or in parallel.

A homopolar connection mentioned in the present disclosure means that when two photovoltaic strings are connected, a positive electrode of one photovoltaic string is connected to a positive electrode of another photovoltaic string, or a negative electrode of one photovoltaic string is connected to a negative electrode of another photovoltaic string.

A heteropolar connection mentioned in the present disclosure means that when two photovoltaic strings are connected, a positive electrode of one photovoltaic string is connected to a negative electrode of another photovoltaic string.

In the present disclosure, a $1^{st}$ polarity terminal and a $2^{nd}$ polarity terminal are positive or negative electrodes of an electrical component. Specifically, when the $1^{st}$ polarity terminal is a positive electrode, the $2^{nd}$ polarity terminal is a negative electrode; or, when the $1^{st}$ polarity terminal is a negative electrode, the $2^{nd}$ polarity terminal is a positive electrode.

Embodiment 1

A photovoltaic power supply control module provided in this embodiment includes: M photovoltaic interfaces, and each photovoltaic interface is used to connect to a photovoltaic string. Specifically, in this embodiment, the M photovoltaic interfaces include: a $1^{st}$ photovoltaic interface, a $2^{nd}$ photovoltaic interface, a $3^{rd}$ photovoltaic interface ... an $(M-1)^{th}$ photovoltaic interface and an $M^{th}$ photovoltaic interface.

The photovoltaic power supply control module includes at least Work State I and Work State II:
  in Work State I, the photovoltaic strings connected to $1^{st}$ to $M^{th}$ photovoltaic interfaces are all in a power supply mode, and supply power to an external load; and
  in Work State II, the photovoltaic strings connected to $1^{st}$ to $(k-1)^{th}$ photovoltaic interfaces are all in the power supply mode and supply power to the photovoltaic string connected to the $k^{th}$ photovoltaic interface in response to the photovoltaic string connected to a $k^{th}$ photovoltaic interface being in a load mode, $2 \leq k \leq M$.

Specifically, in this embodiment, in Work State II, when the photovoltaic strings connected to the $1^{st}$ to $(k-1)^{th}$ photovoltaic interfaces supply power to the photovoltaic string connected to the $k^{th}$ photovoltaic interface, the photovoltaic string connected to the $k^{th}$ photovoltaic interface consumes power and generates heat. Thus, the photovoltaic string connected to the $k^{th}$ photovoltaic interface may automatically heat up and melt snow through the power supplied by the photovoltaic strings connected to the $1^{st}$ to $(k-1)^{th}$ photovoltaic interfaces in a snowy weather.

In this embodiment, in Work State I, the photovoltaic strings connected to the $1^{st}$ to $M^{th}$ photovoltaic interfaces are connected in series; in Work State II, the photovoltaic strings connected to the $1^{st}$ to $(k-1)^{th}$ photovoltaic interfaces are connected in series, in response to the photovoltaic string connected to the $k^{th}$ photovoltaic interface being in the load mode. In this way, a high voltage output may be achieved through connecting in series, which ensures a sufficient operating power for snow melting without high current damage.

Embodiment 2

Compared with Embodiment 1, in this embodiment, the photovoltaic power supply control module further includes a power interface, and the power interface is used to connect to a power supply. In Work State II, the power supply connected to the power interface supplies power to the photovoltaic string connected to the $1^{st}$ photovoltaic interface, in response to this photovoltaic string being in the load mode. In this way, automatic snow melting for the photovoltaic string connected to the $1^{st}$ photovoltaic interface is realized.

Specifically, in this embodiment, in Work State II, the power supply connected to the power interface and the photovoltaic strings connected to the $1^{st}$ to $(k-1)$ photovoltaic interfaces all supply power to the photovoltaic string connected to the $k^{th}$ photovoltaic interface, in response to this photovoltaic string being in the load mode, $2 \leq k \leq M$. In this way, the power supply connected to the power interface may further increase the heating power of the photovoltaic string connected to the photovoltaic interface, so that the snow melting efficiency may be improved.

Further, in this embodiment, in Work State I, the photovoltaic strings connected to the $1^{st}$ to $M^{th}$ photovoltaic interfaces are connected in series; in Work State II, the power supply connected to the power interface and the photovoltaic strings connected to the $1^{st}$ to $(k-1)$ photovoltaic interfaces are connected in series, in response to the photovoltaic string connected to the $k^{th}$ photovoltaic interface being in the load mode.

In this embodiment, in Work State I, only the photovoltaic strings connected to the $1^{st}$ to $M^{th}$ photovoltaic interfaces supply power to an external load, and the output of the power supply connected to the power interface is stopped, to avoid an excessive consumption of the power supply and fully utilize the photovoltaic power.

Embodiment 3

Referring to FIG. 1, a system for controlling photovoltaic strings to perform Domino-type automatic snow melting provided in the present disclosure includes: a controller, M photovoltaic strings and a photovoltaic power supply control module. The photovoltaic power supply control module includes M photovoltaic interfaces. Specifically, the M photovoltaic interfaces include: a $1^{st}$ photovoltaic string, a $2^{nd}$ photovoltaic string, a $3^{rd}$ photovoltaic string ... an $(M-1)^{th}$ photovoltaic string and an $M^{th}$ photovoltaic string; the M photovoltaic interfaces include: a $1^{st}$ photovoltaic interface, a $2^{nd}$ photovoltaic string photovoltaic interface, a $3^{rd}$ photovoltaic interface ... an $(M-1)^{th}$ photovoltaic interface and an $M^{th}$ photovoltaic interface.

M photovoltaic strings are correspondingly connected to M photovoltaic interfaces of the photovoltaic power supply control module, that is, the $1^{st}$ photovoltaic interface is connected to the $1^{st}$ photovoltaic string X1, the $2^{nd}$ photovoltaic interface is connected to the $2^{nd}$ photovoltaic string X2. Similarly, the $M^{th}$ photovoltaic interface is connected to the $M^{th}$ photovoltaic string.

The photovoltaic power supply control module includes at least Work State I and Work State II: in Work State I, the $1^{st}$ to $M^{th}$ photovoltaic strings are all in a power supply mode, and supply power for an external load; in Work State II, the $1^{st}$ to $(k-1)^{th}$ photovoltaic strings are all in the power supply mode in response to a $k^{th}$ photovoltaic string being in a load mode, and the $1^{st}$ to $(k-1)^{th}$ photovoltaic strings supply power to the $k^{th}$ photovoltaic string, $2 \leq k \leq M$.

The controller is connected to the photovoltaic power supply control module to control the switching of working states of the photovoltaic power supply control module and the switching of photovoltaic string which conducts load mode in Work State II. The photovoltaic panel consumes electricity and generates heat when being reversely powered, thereby melting snow covered on it. In this embodiment, the power is supplied to the $k^{th}$ photovoltaic string Xk through the $1^{st}$ photovoltaic string X1 to the $(k-1)^{th}$ photovoltaic string X(k-1), that is, the $k^{th}$ photovoltaic string Xk is reversely powered by the $1^{st}$ photovoltaic string X1 to the $(k-1)^{th}$ photovoltaic string X(k-1), and the control of the heat generation in $k^{th}$ photovoltaic string is achieved, so snow on the $k^{th}$ photovoltaic string is melted, $2 \leq k \leq M$. In this way, the electricity self-supply for heat generation is achieved in off-grid during the snow is being melted.

Specifically, in this embodiment, in Work State II of the photovoltaic power supply control module, the controller is used to control the photovoltaic power supply control module so that the $2^{nd}$ photovoltaic string to the $M^{th}$ photovoltaic string execute the load mode sequentially. In this way, in the process of supplying reverse power to the $2^{nd}$ photovoltaic string X2 to the $M^{th}$ photovoltaic string XM, the supplied power for reverse power supply gradually increases due to an increase in the number of photovoltaic strings used for power generation, so that the heating power of the photovoltaic string that is reversely powered increases, which is beneficial to improve the snow melting efficiency.

Moreover, in this embodiment, the controller controls the switching of the working states of the photovoltaic power supply control module, and an automatic control of heating each photovoltaic string in the system is achieved, so that an automatic control and automatic power supply of snow melting on the photovoltaic string are achieved, which is beneficial to ensure the continuity and reliability of photovoltaic power supply in snowy weather.

Specifically, in this embodiment, the photovoltaic power supply control module is in Work State I, and the $1^{st}$ to $M^{th}$ photovoltaic strings are connected in series to ensure the working voltage of a load; in Work State II of the photovoltaic power supply control module, the $1^{st}$ to $(k-1)^{th}$ photovoltaic strings are connected in series, in response to the photovoltaic string connected to the $k^{th}$ photovoltaic interface being in the load mode. In this way, in Work State II of the photovoltaic power supply control module, the $1^{st}$ photovoltaic string X1 to the $k^{th}$ photovoltaic string Xk are connected in series in response to the $k^{th}$ photovoltaic string being in the load mode, and the voltage of the $k^{th}$ photovoltaic string Xk is the sum of series voltages of the $1^{st}$ photovoltaic string X1 to the $(k-1)^{th}$ photovoltaic string X(k-1). Thus, an operating voltage and heating efficiency of the $k^{th}$ photovoltaic string Xk is ensured$^{th}$, that is, the snow melting efficiency of the $k^{th}$ photovoltaic string Xk is ensured. Specifically, in this embodiment, $\overline{U_k} = \Sigma_{i=1}^{k-1} U_i$, where $\overline{U_k}$ is the operating voltage of the $k^{th}$ photovoltaic string Xk, and $U_i$ is the output voltage of the $i^{th}$ photovoltaic string, $2 \leq k \leq M$.

Specifically, in this embodiment, in Work State II of the photovoltaic power supply control module, as photovoltaic strings in the load mode are different, connection relationships of each photovoltaic string are as follows.

In response to the $2^{nd}$ photovoltaic string X2 being in the load mode, the $1^{st}$ polarity terminal of the $2^{nd}$ photovoltaic string X2 is connected to the $1^{st}$ polarity terminal of the $1^{st}$ photovoltaic string X1, and the $2^{nd}$ polarity terminal of the $2^{nd}$ photovoltaic string X2 is connected to the $1^{st}$ polarity terminal of the $1^{st}$ photovoltaic string X1, so that the $1^{st}$ photovoltaic string is used to reversely supply power to the $2^{nd}$ photovoltaic string.

In response to the $3^{rd}$ photovoltaic string X3 being in the load mode, the $1^{st}$ polarity terminal of the $3^{rd}$ photovoltaic string X3 is connected to the $1^{st}$ polarity terminal of the $2^{nd}$ photovoltaic string X2, the $2^{nd}$ polarity terminal of the $2^{nd}$ photovoltaic string X2 is connected to the $1^{st}$ polarity terminal of the $1^{st}$ photovoltaic string X1, and the $2^{nd}$ polarity terminal of the $1^{st}$ photovoltaic string X1 is connected to the $2^{nd}$ polarity terminal of the $3^{rd}$ photovoltaic string X3.

Similarly, in response to the $(s-1)^{th}$ photovoltaic string X(s+1) being in the load mode, the $1^{st}$ polarity terminal of the $(s+1)^{th}$ photovoltaic string X(s+1) is connected to the $1^{st}$ polarity terminal of the $s^{th}$ photovoltaic string Xs, the $2^{nd}$ polarity terminal of the $(s+1)^{th}$ photovoltaic string is connected to the $2^{nd}$ polarity terminal of the $1^{st}$ photovoltaic string X1, and the $2^{nd}$ polarity terminal of the $j^{th}$ photovoltaic string is connected to the $1^{st}$ polarity terminal of the $(j-1)^{th}$ photovoltaic string, $2 \leq j \leq s$, $2 \leq s \leq M-1$.

Figure 2:
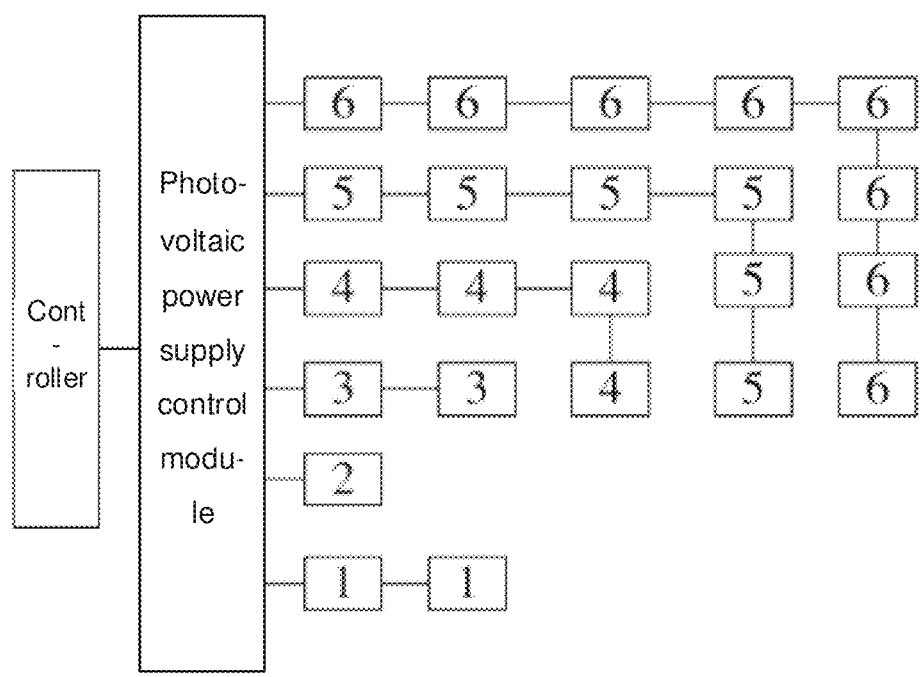
FIG. 2 shows a further schematic diagram of a system for controlling photovoltaic strings to perform Domino-type automatic snow melting provided in Embodiment 3.

Specifically, in this embodiment, the number of photovoltaic panels in the $2^{nd}$ photovoltaic string to the $M^{th}$ photovoltaic string increases sequentially. As shown in FIG. 2, in this embodiment, the $2^{nd}$ photovoltaic string includes one photovoltaic panel, the $3^{rd}$ photovoltaic string includes two photovoltaic panels, and the number of photovoltaic panels in the $n^{th}$ photovoltaic string is 2 more than that in the $(n-1)^{th}$ photovoltaic string, $4 \leq n \leq M$. That is, the number of photovoltaic panels in the $3^{rd}$ photovoltaic string, in the $4^{th}$ photovoltaic string ... and in the $M^{th}$ photovoltaic string are in an arithmetic progression. Specifically, in FIG. 2, for the ease of distinguish, the photovoltaic panels in the $1^{st}$ photovoltaic string are marked with "1", the photovoltaic panels in the $2^{nd}$ photovoltaic string are marked with "2", the photovoltaic panels in the $3^{rd}$ photovoltaic string are marked with "3", the photovoltaic panels in the $4^{th}$ photovoltaic string are marked with "4", the photovoltaic panels in the $5^{th}$ photovoltaic string are marked with "5", and the photovoltaic panels in the $6^{th}$ photovoltaic string are marked with "6".

In the specific implementation, it may also be set that the number of photovoltaic panels in the $2^{nd}$ photovoltaic string X2, in the $3^{rd}$ photovoltaic string X3, in the $4^{th}$ photovoltaic string X4 ... and in the $M^{th}$ photovoltaic string increases in an arithmetic progression or in a geometric progression sequentially, that is, $w_{i+1} - w_i = a1$, or $$\frac{w_{i+1}}{w_i} = a2, \text{ or } \frac{w_{i+1} - w_i}{w_i - w_{i-1}} = a3,$$

where $w_{i+1}$ is the number of photovoltaic panels in the $(i+1)^{th}$ photovoltaic string, $w_i$ is the number of photovoltaic panels in the $i^{th}$ photovoltaic string, and $w_{i+1}$ is the number of photovoltaic panels in the $(i-1)^{th}$ photovoltaic string, $2 \leq i \leq M-1$, a1, a2 and a3 are constants, and a1, a2 and a3 are all positive integers greater than 1.

The system for controlling photovoltaic strings to perform Domino-type automatic snow melting provided in this embodiment is suitable for snow melting through a reverse power supply with heat generation on the photovoltaic string. In this embodiment, the photovoltaic panels in the $2^{nd}$ photovoltaic string X2, and the photovoltaic panels in the $3^{rd}$ photovoltaic string X3 to the photovoltaic panels in the $M^{th}$ photovoltaic string XM are all installed on the same inclined plane A. In this way, when a layer of snow melts on the surface of photovoltaic panels, the snow on the photovoltaic panel will slide down through its own weight. Snow removal is achieved by melting and sliding down, which is beneficial to reduce the power consumption.

In this embodiment, all photovoltaic panels on the inclined plane A are arranged in a matrix, and in a row of photovoltaic panels in an inclined direction of the inclined plane A, the serial number of a photovoltaic string in which a photovoltaic panel is located lower is less than the serial number of a photovoltaic string in which a photovoltaic panel is located higher. In this way, in the process of snow melting, it is ensured that snow removal on the lower photovoltaic panel is completed earlier that that on the higher photovoltaic panel. So that the movement obstacle during the snow sliding process may be avoided, which improves the snow removal efficiency.

Specifically, in this embodiment, the photovoltaic panels in the $1^{st}$ photovoltaic string may be installed on the inclined plane A. Snow on the $1^{st}$ photovoltaic string may be removed by the manual snow removal method, so that the $1^{st}$ photovoltaic string may provide an initial power supply to achieve the automatic snow melting of the $2^{nd}$ photovoltaic string to the $M^{th}$ photovoltaic string.

Figure 14:
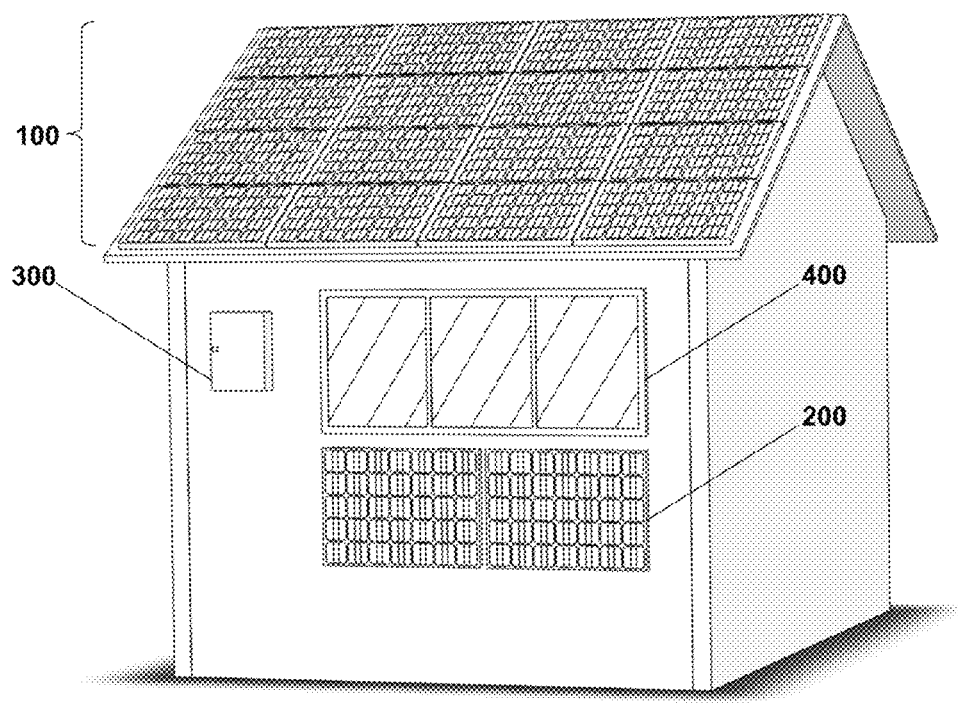
FIG. 14 shows an overall schematic diagram of a system for controlling photovoltaic strings to perform Domino-type automatic snow melting provided in the present disclosure.

In the specific implementation, the photovoltaic panels in the $1^{st}$ photovoltaic string may also be installed vertically, so that the photovoltaic panels in the $1^{st}$ photovoltaic string cannot be covered by snow, and the automatic snow melting of the $2^{nd}$ to $M^{th}$ photovoltaic strings is ensured. Specifically, as shown in FIG. 14, the photovoltaic panels in the $1^{st}$ photovoltaic string form the $1^{st}$ photovoltaic panel set 200, and the photovoltaic panels in the $1^{st}$ photovoltaic panel set 200 are all vertically installed on a southward wall and are all installed below the window 400 to avoid light blocked by eaves; the photovoltaic panels in the $2^{nd}$ to $M^{th}$ photovoltaic strings form a $2^{nd}$ photovoltaic panel set 100, and the photovoltaic panels in the $2^{nd}$ photovoltaic panel set 100 are all installed on a southward roof. In this embodiment, the controller 300 is also installed on the wall.

The system for controlling photovoltaic strings to perform Domino-type automatic snow melting provided in this embodiment further includes a current sensor, the current sensor is connected in series with the $1^{st}$ photovoltaic string X1, and the current sensor is used to detect the current value of the $1^{st}$ photovoltaic string X1. The controller is connected to the current sensor, and the controller is used to control the switching of working states of the photovoltaic power supply control module according to the detection value of the current sensor. Specifically, in this embodiment, M-1 current thresholds may be set for Work State II of the photovoltaic power supply control module. In Work State II, when the $2^{nd}$ photovoltaic string is in the load mode and the detection value of the current sensor reaches the $1^{st}$ current threshold, the controller controls the photovoltaic power supply control module so that the $3^{rd}$ photovoltaic string is switched to the load mode $1^{st}$; similarly, when the $(k-1)^{th}$ photovoltaic string is in the load mode and the detection value of the current sensor reaches the $(k-2)^{th}$ current threshold, the controller controls the photovoltaic power supply control module so that the $k^{th}$ photovoltaic string is switched to the load mode, $2 \leq k \leq M$; when the $M^{th}$ photovoltaic string is in the load mode and the detection value of the current sensor reaches an (M-1) current threshold, the controller controls the working state of the photovoltaic power supply control module to be switched to Work State I.

The embodiment provides a system for controlling photovoltaic strings to perform Domino-type automatic snow melting. In the specific implementation, pressure sensors may also be installed on the $2^{nd}$ to $M^{th}$ photovoltaic strings respectively to detect snow accumulation, that is, the $1^{st}$ pressure sensor is installed on the $2^{nd}$ photovoltaic string X2, and the $2^{nd}$ pressure sensor is installed on the $3^{rd}$ photovoltaic string X3 . . . . Similarly, the $(M-1)^{th}$ pressure sensor is provided on the $M^{th}$ photovoltaic string. The controller is connected to the $1^{st}$ pressure sensor, the $2^{nd}$ pressure sensor, and to the $(M-1)^{th}$ pressure sensors, respectively. In Work State II of the photovoltaic power supply control module, the controller is used to control the photovoltaic power supply control module so that the $(n+1)^{th}$ photovoltaic string is switched to the load mode when the detection value of the $n^{th}$ pressure sensor reaches the preset pressure threshold, $1 \leq n \leq M-1$.

Further, the system for controlling photovoltaic strings to perform Domino-type automatic snow melting provided in this embodiment further includes an inverter, and the inverter is connected to an output power supply interface. In Work State I of the photovoltaic power supply control module, the inverter is used to convert voltages output by the $1^{st}$ photovoltaic string X1 to the $M^{th}$ photovoltaic string XM into the alternating voltages for output. The controller is connected to the inverter, and the controller is used to switch the photovoltaic power supply control module from Work State I to Work State II when the inverter stops working. Specifically, in this embodiment, the inverter works only when the $1^{st}$ photovoltaic string X1 to the $M^{th}$ photovoltaic string XM all generate electricity normally to ensure the output alternating voltage value of the inverter. In this way, in this embodiment, whether the photovoltaic string needs to be cleaned can be determined according to the working state of the inverter.

Specifically, in this embodiment, the controller controls the working state of the photovoltaic power supply control module to be switched from Work State I to Work State II according to the working state of the inverter, so that an automatic detection and cleaning for snow on the photovoltaic string are achieved.

Moreover, in this embodiment, after the system enters a snow removal state, that is, after the working state of the photovoltaic power supply control module is switched to Work State II, the controller may also automatically control the switching of the photovoltaic string that is reversely powered, that is, a photovoltaic string in the load mode, according to the detection value of the current sensor or the detection value of the pressure sensor or other detection values, so as to ensure the snow removal. The inverter may be reworked through the switching from Work State II to Work State I of the photovoltaic power supply control module, so that the photovoltaic power supply can be restarted.

The system for controlling photovoltaic strings to perform Domino-type automatic snow melting in Embodiment 3 will be further described below with references to two specific embodiments.

Embodiment 4

Figure 3:
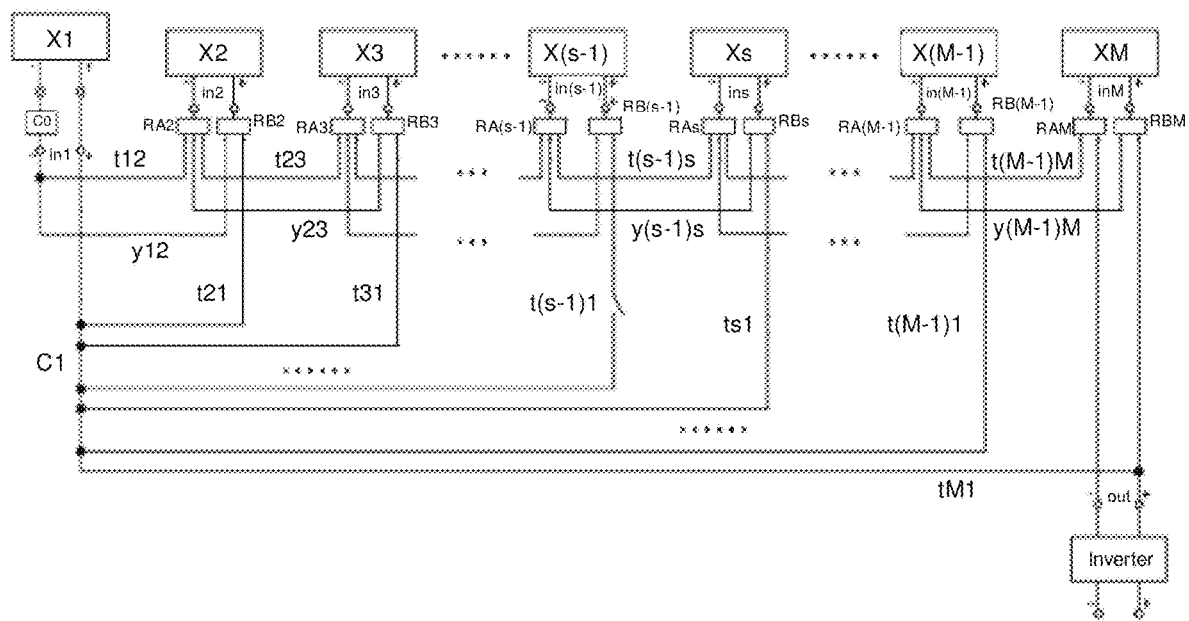
FIG. 3 shows a circuit diagram of a system for controlling photovoltaic strings to perform Domino-type automatic snow melting provided in Embodiment 4.

Referring to FIG. 3, in the system for controlling photovoltaic strings to perform Domino-type automatic snow melting provided in this embodiment, the photovoltaic power supply control module includes a photovoltaic interface corresponding to each photovoltaic string.

Figure 4:
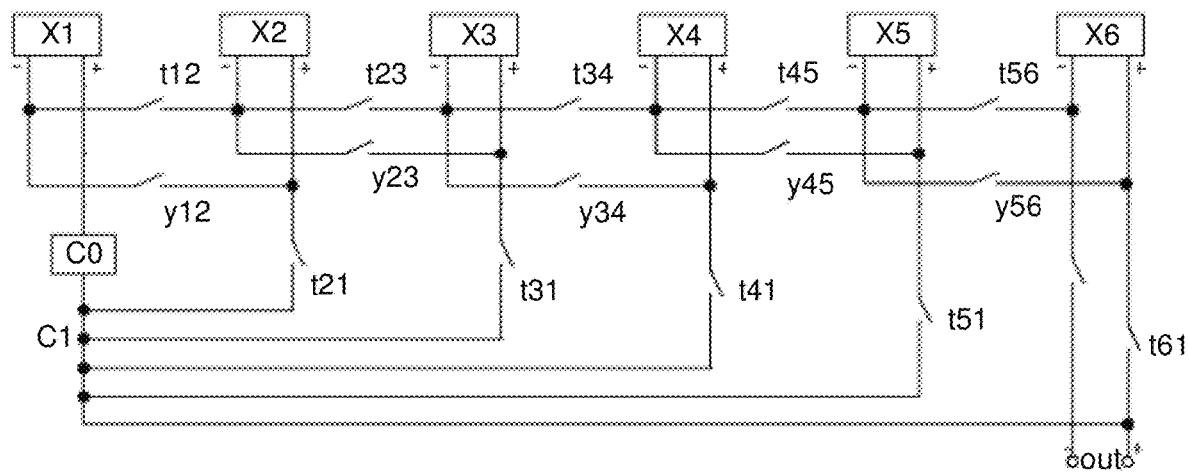
FIG. 4 shows a schematic diagram of a system circuit in response to M=6 in Embodiment 4.

The photovoltaic power supply control module further includes homopolar connection lines, heteropolar connection lines and reverse jumper lines corresponding to each string of the $2^{nd}$ photovoltaic string X2 to the $M^{th}$ photovoltaic string. Specifically, in this embodiment, the homopolar connection line corresponding to the $k^{th}$ photovoltaic string in the photovoltaic power supply control module is the $k^{th}$ homopolar connection line $t(k-1)k$ for connecting the $1^{st}$ polarity terminal of the $k^{th}$ photovoltaic string and the $1^{st}$ polarity terminal of the $(k-1)^{th}$ photovoltaic string, the heteropolar connection line corresponding to the $k^{th}$ photovoltaic string in the photovoltaic power supply control module is the $k^{th}$ heteropolar connection line $y(k-1)k$ for connecting the $2^{nd}$ polarity terminal of the $k^{th}$ photovoltaic string and the $1^{st}$ polarity terminal of the $(k-1)^{th}$ photovoltaic string, and the reverse jumper line corresponding to the $k^{th}$ photovoltaic string in the photovoltaic power supply control module is the $k^{th}$ reverse jumper line $tk1$ for connecting the $2^{nd}$ polarity terminal of the $k^{th}$ photovoltaic string and the $2^{nd}$ polarity terminal of the $1^{st}$ photovoltaic string X1, $2 \leq k \leq M$. FIG. 4 shows a circuit diagram in response to M=6 in this embodiment.

In this embodiment, each homopolar connection line has a short-circuit (on) state and an open-circuit (off) state respectively, each heteropolar connection line has a short-circuit (on) state and an open-circuit (off) state respectively, and each reverse jumper line has a short-circuit (on) state and an open-circuit (off) state. In this way, the controller achieves the switching of working states of the photovoltaic power supply control module by controlling on/off of the homopolar connection lines, the heteropolar connection lines and the reverse jumper lines.

Figure 5:
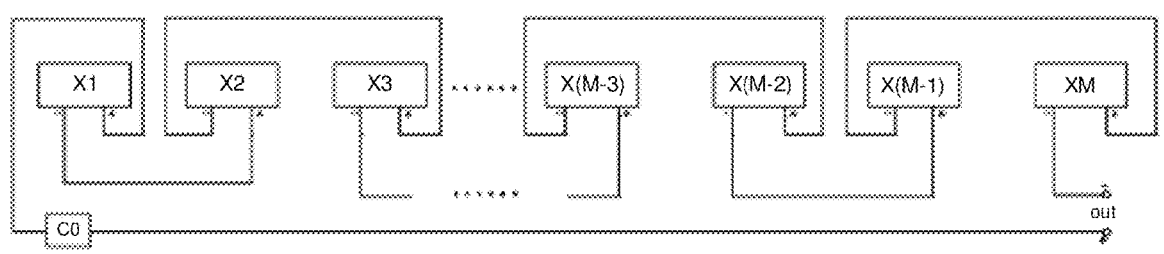
FIG. 5 shows a working circuit diagram of the system shown in FIG. 3 in Work State I.

Specifically, in this embodiment, in Work State I of the photovoltaic power supply control module, a working circuit diagram of the system is shown in FIG. 5. At this time, the $1^{st}$ photovoltaic string X1 to the $M^{th}$ photovoltaic string XM are all used for photovoltaic power generation, and the output voltage of the system is $U_{OUT} = \Sigma_{i=1}^{M} U_i$, where $U_i$ is the output voltage of the $i^{th}$ photovoltaic string Xi.

Figure 6:
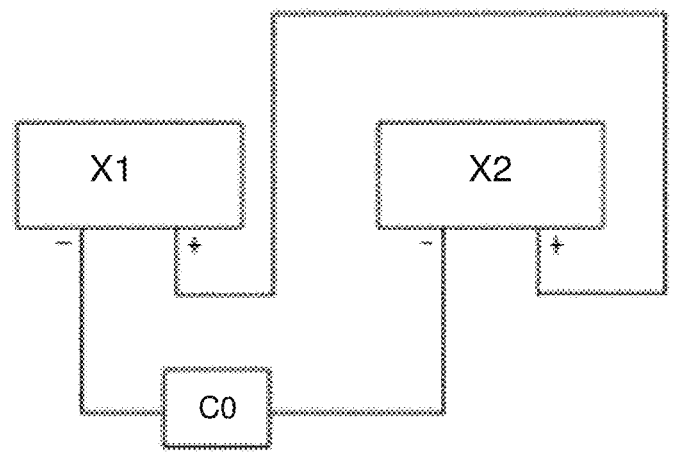
FIG. 6 shows a working circuit diagram of the system shown in FIG. 3 in Work State II in response to a $2^{nd}$ photovoltaic string being in a load mode.
Figure 7:
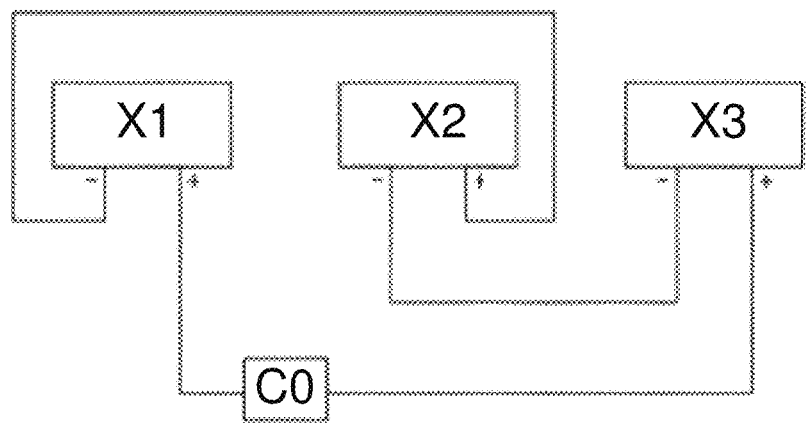
FIG. 7 is a working circuit diagram of the system shown in FIG. 3 in Work State II in response to a $3^{rd}$ photovoltaic string being in a load mode.

In this embodiment, when the photovoltaic power supply control module is in Work State II and the $2^{nd}$ photovoltaic string X2 is in the load mode, the working circuit diagram of the system is shown in FIG. 6. At this time, the $1^{st}$ photovoltaic string X1 supplies power reversely to the $2^{nd}$ photovoltaic string. In this embodiment, when the photovoltaic power supply control module is in Work State II and the $3^{rd}$ photovoltaic string X3 is in the load mode, the working circuit diagram of the system is shown in FIG. 7.

Figure 8:
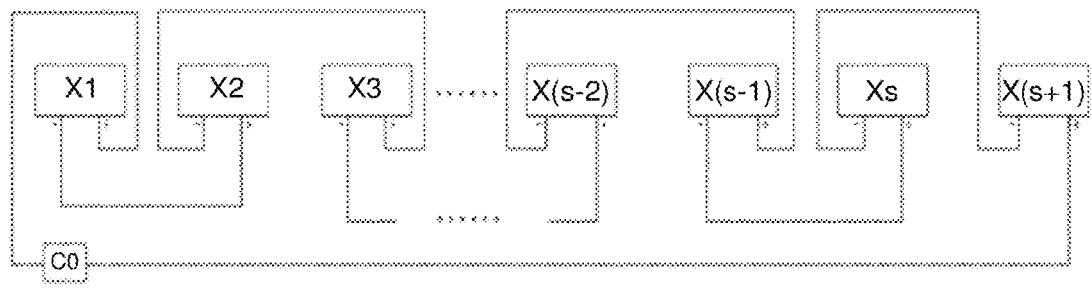
FIG. 8 shows a working circuit diagram of the system shown in FIG. 3 in Work State II in response to an $(s+1)^{th}$ photovoltaic string being in a load mode.

In this embodiment, when the photovoltaic power supply control module is in Work State II and the $(s+1)^{th}$ photovoltaic string X(s+1) is in the load mode, $2 \leq s \leq M-1$, the working circuit diagram of the system is shown in FIG. 8.

In this embodiment, a current sensor C0 is connected in series with the $2^{nd}$ polarity terminal or the $1^{st}$ polarity terminal of the $1^{st}$ photovoltaic string X1. In the specific implementation, a current detection node C1 may be set in the photovoltaic power supply control module, which can be connected to the $2^{nd}$ polarity terminal of the $1^{st}$ photovoltaic string X1 and each reverse jumper line. The current sensor is arranged in the circuit module and is connected in series between the $2^{nd}$ polarity terminal of the $1^{st}$ photovoltaic string X1 and the current detection node C1. In this embodiment, for the detailed arrangement of the current sensor, please specifically refer to FIG. 4, FIG. 5, FIG. 6, FIG. 7 and FIG. 8.

In the specific implementation, it may also be set that the current sensor is connected in series between the $1^{st}$ photovoltaic string X1 and the $1^{st}$ photovoltaic interface of the photovoltaic power supply control module, please specifically refer to FIG. 3.

In this embodiment, M current thresholds are preset in the controller. The M current thresholds are respectively: in Work State II, the $1^{st}$ current threshold of the $2^{nd}$ photovoltaic string X2 in the load mode, the $2^{nd}$ current threshold of the $3^{rd}$ photovoltaic string X3 in the load mode . . . the $(M-1)^{th}$ current threshold of the $M^{th}$ photovoltaic string XM in the load mode; and the $M^{th}$ current threshold corresponding to Work State I.

In this embodiment, in Work State I of the photovoltaic power supply control module, if the detected current value acquired by the current sensor is less than the $M^{th}$ current threshold, the controller controls the working state of the photovoltaic power supply control module to be switched to Work State II and controls the $2^{nd}$ photovoltaic string X2 to be in the load mode; in Work State II of the photovoltaic power supply control module, in response to the $s^{th}$ photovoltaic string Xs being in the load mode, if the detected current value acquired by the current sensor is greater than or equal to the $(s-1)^{th}$ current threshold, the controller controls the photovoltaic power supply control module so that the $(s+1)^{th}$ photovoltaic string X(s+1) is switched to be in the load mode; $2 \leq s \leq M-1$.

In this embodiment, in Work State I of the photovoltaic power supply control module, an external load is connected through a preset power supply output terminal out on the photovoltaic power supply control module. Specifically, in this embodiment, the $1^{st}$ polarity terminal of the power supply output terminal out is connected to the $1^{st}$ polarity terminal of the $M^{th}$ photovoltaic string, and the $2^{nd}$ polarity terminal of the power supply output terminal out is connected to the $2^{nd}$ polarity terminal of the $1^{st}$ photovoltaic string X1. In Work State I of the photovoltaic power supply control module, the $1^{st}$ photovoltaic string X1 to the $M^{th}$ photovoltaic string are connected in series to supply power to the external load connected through the power supply output terminal out.

In the specific implementation, the homopolar connection lines, the heteropolar connection lines and the reverse jumper lines may be controlled on/off by using a switch element, the controller is connected to each switch element, and the controller achieves the on-off control of the homopolar connection lines, the heteropolar connection lines and the reverse jumper lines by controlling on/off of each switch element. Please specifically refer to FIG. 4.

Referring to FIG. 3, in this embodiment, the homopolar connection lines, the heteropolar connection lines and the reverse jumper lines are all implemented by wires. The photovoltaic power supply control module of the embodiment also includes 2M-2 relays. The 2M-2 relays are respectively: a relay RA2 corresponding to the $1^{st}$ polarity terminal of the $2^{nd}$ photovoltaic string X2, a relay RA3 corresponding to the $1^{st}$ polarity terminal of the $3^{rd}$ photovoltaic string X3 . . . a relay RA(M-1) corresponding to the $1^{st}$ polarity terminal of the $(M-1)^{th}$ photovoltaic string, a relay RAM corresponding to the $1^{st}$ polarity terminal of the $M^{th}$ photovoltaic string, a relay RB2 corresponding to the $2^{nd}$ polarity terminal of the $2^{nd}$ photovoltaic string X2, a relay RB3 corresponding to the $2^{nd}$ polarity terminal of the $3^{rd}$ photovoltaic string X3 . . . a relay RB(M-1) corresponding to the $2^{nd}$ polarity terminal of the $(M-1)^{th}$ photovoltaic string and a relay RBM corresponding to the $2^{nd}$ polarity terminal of the $M^{th}$ photovoltaic string.

Specifically, in this embodiment, the $1^{st}$ polarity terminal of the $2^{nd}$ photovoltaic string X2 is respectively connected to a homopolar connection line t12, a homopolar connection line t23 and a heteropolar connection line y23 through the relay RA2; the $2^{nd}$ polarity terminal of the $2^{nd}$ photovoltaic string X2 is respectively connected to a reverse jumper line t21 and a heteropolar connection line y12 through the relay RB2.

The polarity terminal of the $3^{rd}$ photovoltaic string X3 is respectively connected to the homopolar connection line t23, homopolar connection line t34 and heteropolar connection line y34 through the relay RA3; the $2^{nd}$ polarity terminal of the $3^{rd}$ photovoltaic string X3 is respectively connected to the reverse jumper line t31 and heteropolar connection line y23 through the relay RB3.

Similarly, the $1^{st}$ polarity terminal of the $s^{th}$ ($2 \leq s \leq M-1$) photovoltaic string is respectively connected to the homopolar connection line ts(s+1), homopolar connection line ts(s+1) and heteropolar connection line ys(s+1) through the relay RAs; the $2^{nd}$ polarity terminal of the $s^{th}$ photovoltaic string is respectively connected to the reverse jumper line ts1 and heteropolar connection line y(s-1)s through the relay RBs.

The $1^{st}$ polarity terminal of the $M^{th}$ photovoltaic string is respectively connected to the homopolar connection line t(M-1)M and the $1^{st}$ polarity terminal of the power supply output terminal out through the relay RAM, and the $2^{nd}$ polarity terminal of the $M^{th}$ photovoltaic string XM is respectively connected to the reverse jumper line tM1 and the heteropolar connection line y(M-1)M through the relay RBM. The $2^{nd}$ polarity terminal of the power supply output terminal out is connected to the $2^{nd}$ polarity terminal of the $1^{st}$ photovoltaic string X1, that is, the $2^{nd}$ polarity terminal of the power supply output terminal out is equipotentially connected to the reverse jumper line tM1.

In this way, in this embodiment, the controller is connected to each relay respectively, and controls on/off of the homopolar connection lines, the heteropolar connection lines and the reverse jumper lines by controlling the conduction direction of the relays, so that a switching of working states of the photovoltaic power supply control module can be controlled.

Specifically, in this embodiment, an inverter is also included. The $1^{st}$ polarity terminal of the input terminal of the inverter is connected to the $1^{st}$ polarity terminal of the power supply output terminal out, and the $2^{nd}$ polarity terminal of the input terminal of the inverter is connected to the $2^{nd}$ polarity terminal of the power supply output terminal out.

In this embodiment, the controller is connected to the inverter and each relay, respectively. The controller controls the on/off of the homopolar connection lines, the heteropolar connection lines and the reverse jumper lines by controlling the conduction direction of the relays.

In this way, in this embodiment, it may also be set that when the inverter stops working, the controller controls the photovoltaic power supply control module to be switched to Work State II; in Work State II of the photovoltaic power supply control module: in response to the $2^{nd}$ photovoltaic string X2 being the load mode, if the detected current value acquired by the current sensor is greater than or equal to the $1^{st}$ current threshold, the controller controls the photovoltaic power supply control module so that the $3^{rd}$ photovoltaic string X3 is switched to the load mode; in response to the $3^{rd}$ photovoltaic string X3 being in the load mode, if the detected current value acquired by the current sensor is greater than or equal to the $2^{nd}$ current threshold, the controller controls the photovoltaic power supply control module so that the $4^{th}$ photovoltaic string X4 is switched to the load mode; similarly, in response to the $s^{th}$ photovoltaic string Xs being in the load mode, if the detected current value acquired by the current sensor is greater than or equal to the $(s-1)^{th}$ current threshold, the controller controls the photovoltaic power supply control module so that the $(s+1)^{th}$ photovoltaic string X(s+1) is switched to the load mode, $2 \leq s \leq M-1$.

Embodiment 5

Figure 9:
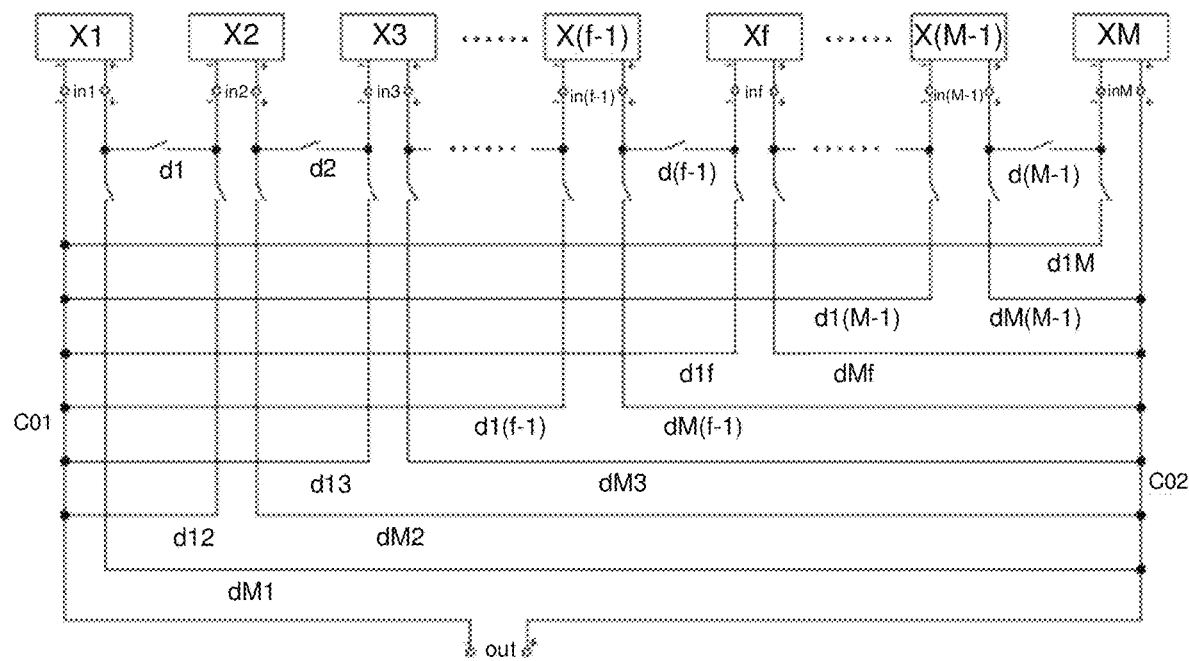
FIG. 9 shows a circuit diagram of a system for controlling photovoltaic strings to perform Domino-type automatic snow melting in Embodiment 5.

Referring to FIG. 9, in the system for controlling photovoltaic strings to perform Domino-type automatic snow melting provided in this embodiment, the photovoltaic power supply control module includes a $1^{st}$ node CO1, a $2^{nd}$ node CO2, a power supply output terminal out for connecting an external load, and photovoltaic interfaces in1 to inM corresponding to the photovoltaic strings, and further include one series line and two reverse lines corresponding to each photovoltaic string form the $2^{nd}$ photovoltaic string X2 to the $M^{th}$ photovoltaic string XM. Specifically, the series line corresponding to the $k^{th}$ photovoltaic string in the photovoltaic power supply control module is d(k-1), and the two reverse lines corresponding to the $k^{th}$ photovoltaic string in the photovoltaic power supply control module are d1k and dM(k-1), $2 \leq k \leq M$.

Specifically, in this embodiment, the $1^{st}$ node is equipotentially connected to the $1^{st}$ polarity terminal of the $1^{st}$ photovoltaic string X1, and the $2^{nd}$ node is equipotentially connected to the $2^{nd}$ polarity terminal of the $M^{th}$ photovoltaic string. Moreover, the $1^{st}$ node is further connected to the $1^{st}$ polarity terminal of the power supply output terminal out, and the $2^{nd}$ node is further connected to the $2^{nd}$ polarity terminal of the power supply output terminal out.

The series line d(k-1) are respectively connected to a $2^{nd}$ polarity terminal of the $(k-1)^{th}$ photovoltaic string and the $1^{st}$ polarity terminal of the $k^{th}$ photovoltaic string, the reverse line d1k are respectively connected to the $1^{st}$ node and the $1^{st}$ polarity terminal of the $k^{th}$ photovoltaic string, and the reverse line dM(k-1) are respectively connected to the $2^{nd}$ node and the $2^{nd}$ polarity terminal of the $(k-1)^{th}$ photovoltaic string.

In this embodiment, each series line d(k-1) and reverse lines d1k, dM(k-1) have two states of short-circuit (on) and open-circuit (off). The controller is connected to each series line and each reverse line. The controller achieves the switching of working states of the photovoltaic power supply control module by controlling whether each series line and each reverse line are turned on.

Figure 10:
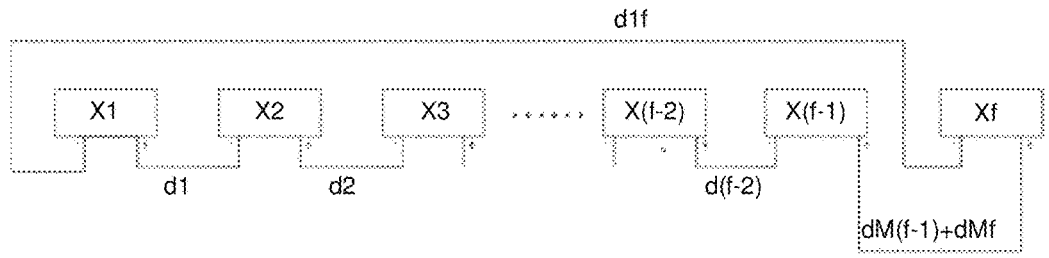
FIG. 10 shows a working circuit diagram of the system shown in FIG. 9 in Work State II in response to an $f^{th}$ photovoltaic string being in a load mode.

Specifically, in this embodiment, in Work State II of the photovoltaic power supply control module:

when reverse lines d12, dM2 and dM1 are turned on, the $2^{nd}$ photovoltaic string X2 as a load is reversely powered by the $1^{st}$ photovoltaic string as a power supply;

when reverse lines d13, dM3 and dM2 and series line d1 are turned on, the $3^{rd}$ photovoltaic string X3 as a load is reversely powered by the $1^{st}$ photovoltaic string X1 and the $2^{nd}$ photovoltaic string X2 as a power supply.

referring to FIG. 9, when reverse lines d1f, dMf and dM(f-1) and series lines d1, d2 . . . d(f-2) are all turned on, the $f^{th}$ photovoltaic string Xf as a load is reversely powered by the $1^{st}$ photovoltaic string X1 to the $(f-1)^{th}$ photovoltaic string X(f-1) as a power supply; specifically, at this time, the $1^{st}$ polarity terminal of the $f^{th}$ photovoltaic string Xf is connected to the $1^{st}$ node through the reverse line d1f, the $2^{nd}$ polarity terminal of the $f^{th}$ photovoltaic string Xf is turned on with the $2^{nd}$ polarity terminal of the $(f-1)^{th}$ photovoltaic string X(f-1) through the reverse lines dMf and dM(f-1). At the same time, the series lines d1, d2 . . . d(f-2) are all turned on, so as to form an equivalent circuit as shown in FIG. 10; $2 \leq f \leq M-1$; and when reverse lines d1M and dM(M-1) and series lines d1, d2, . . . d(M-2) are turned on, the $M^{th}$ photovoltaic string as a load is reversely powered by the $1^{st}$ photovoltaic string X1 to the $(M-1)^{th}$ photovoltaic string X(M-1) as a power supply.

In Work State I of the photovoltaic power supply control module, series lines d1, d2, d3, . . . d(M-1) are turned on, so that the $1^{st}$ photovoltaic string X1 to the $M^{th}$ photovoltaic string are connected in series to supply power to the external load connected through the power supply output terminal out. At this time, the output voltage of the system is $U_{OUT} = \Sigma_{i=1}^{M} U_i$, where $U_i$ is the output voltage of the $i^{th}$ photovoltaic string.

Specifically, in this embodiment, a pressure sensor is installed on each photovoltaic string of the $2^{nd}$ photovoltaic string X2 to the $M^{th}$ photovoltaic string XM, and the pressure sensor on the $k^{th}$ photovoltaic string is named as the $(k-1)^{th}$ pressure sensor, $2 \leq k \leq M$.

A pressure threshold is set in the controller. The controller is respectively connected to each pressure sensor and control the switching of working states of the photovoltaic power supply control module according to the comparison result between the detected pressure value by each pressure sensor and the pressure threshold.

Specifically, in this embodiment, when the controller determines that the detected pressure value by the $(f-1)^{th}$ pressure sensor is greater than the pressure threshold, the controller controls the working state of the photovoltaic power supply control module to be switched to Work State II and switches the $f^{th}$ photovoltaic string to the load mode, please specifically refer to FIG. 10.

In the specific implementation of the embodiment, a switch element may be set on each series line and each reverse line, and the controller is connected to each switch element, so that the controller achieves the on-off control of each series line and each reverse line by controlling on/off of the switch element.

Figure 11:
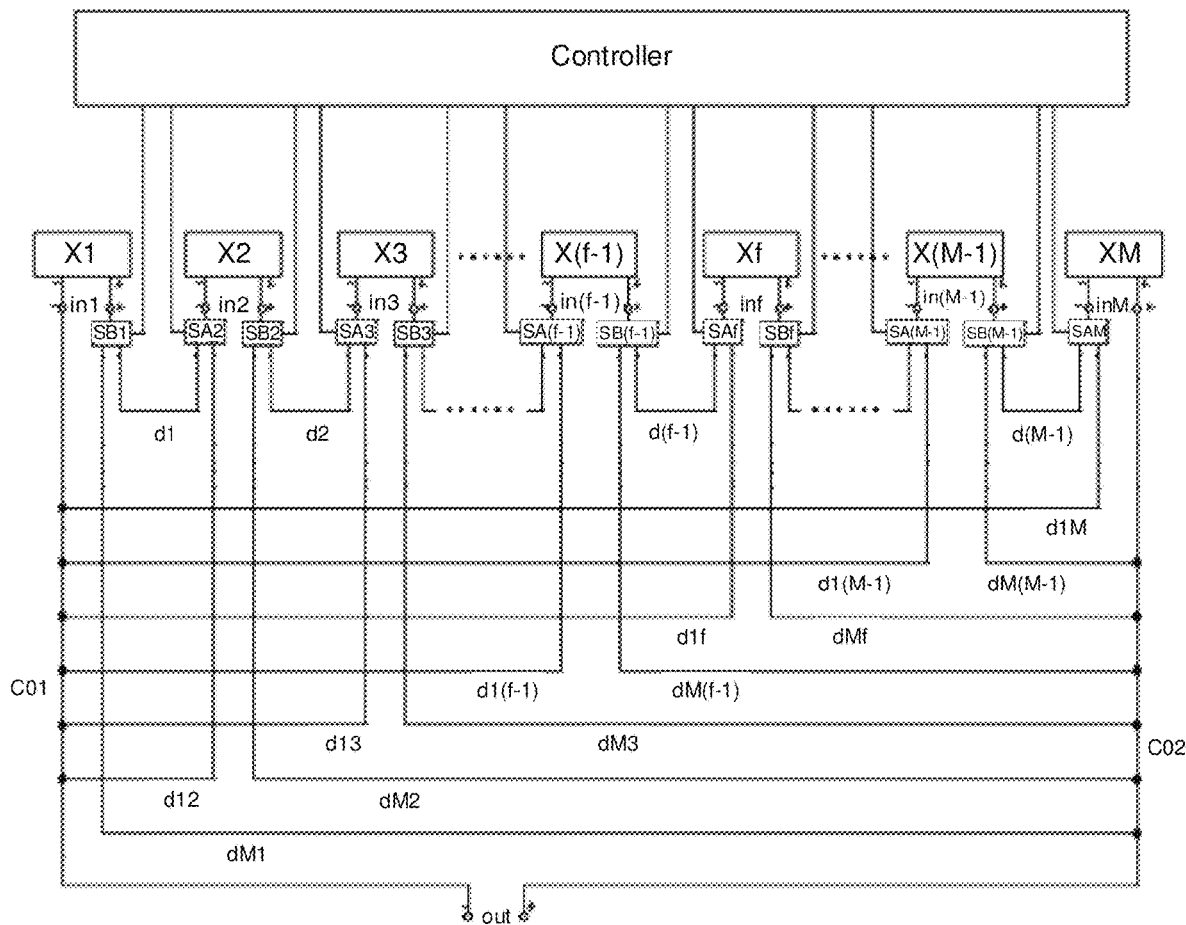
FIG. 11 shows a circuit diagram of the system shown in Embodiment 5.

Alternatively, referring to FIG. 11, in this embodiment, the series lines and the reverse lines are all implemented by wires. The photovoltaic power supply control module in this embodiment also includes 2M-2 relays, and the 2M-2 relays are all one-in two-out relays. Specifically, M-1 relays of the 2M-2 relays are respectively a relay SB1 corresponding to the $2^{nd}$ polarity terminal of the $1^{st}$ photovoltaic string X1, a relay SB2 corresponding to the $2^{nd}$ polarity terminal of the $2^{nd}$ photovoltaic string X2, a relay SB3 corresponding to the $2^{nd}$ polarity terminal of the $3^{rd}$ photovoltaic string X3, . . . and a relay SB(M-1) corresponding to the $2^{nd}$ polarity terminal of the $(M-1)^{th}$ photovoltaic string; the remaining M-1 relays are respectively a relay SA2 corresponding to the $1^{st}$ polarity terminal of the $2^{nd}$ photovoltaic string X2, a relay SA3 corresponding to the $1^{st}$ polarity terminal of the $3^{rd}$ photovoltaic string X3, . . . a relay SA(M-1) corresponding to the $1^{st}$ polarity terminal of the $(M-1)^{th}$ photovoltaic string, and a relay SAM corresponding to the $1^{st}$ polarity terminal of the $M^{th}$ photovoltaic string.

Specifically, referring to FIG. 11, in this embodiment, the $2^{nd}$ polarity terminal of the $1^{st}$ photovoltaic string X1 is respectively connected to the series line d1 and the reverse line dM1 through the relay SB1, and the $1^{st}$ polarity terminal of the $M^{th}$ photovoltaic string is respectively connected to the series line d(M−1) and the reverse line d1M through the relay SAM.

The $1^{st}$ polarity terminal of the $2^{nd}$ photovoltaic string X2 is respectively connected to the series circuit d1 and the reverse circuit d12 through the relay SA2, and the $2^{nd}$ polarity terminal of the $2^{nd}$ photovoltaic string X2 is respectively connected to the series circuit d2 and the reverse circuit dM2 through the relay SB2.

The $1^{st}$ polarity terminal of the $3^{rd}$ photovoltaic string X3 is respectively connected to the series line d2 and the reverse line d13 through the relay SA3, and the $2^{nd}$ polarity terminal of the $3^{rd}$ photovoltaic string X3 is respectively connected to the series line d3 and the reverse line dM3 through the relay SB3.

By analogy, the $1^{st}$ polarity terminal of the $f^{th}$ photovoltaic string Xf is respectively connected to the series line d(f−1) and the reverse line d1f through a relay SAf, and the $2^{nd}$ polarity terminal of the $f^{th}$ photovoltaic string Xf is respectively connected to the series line df and the reverse line dMf through a relay SBf; 2≤f≤M−1.

In this embodiment, the controller is connected to each relay to control on/off of the series lines and the reverse lines by controlling the conduction of the relays, so that the switching of working states of the photovoltaic power supply control module can be controlled, please specifically refer to FIG. 11.

Embodiment 6

Compared to Embodiment 4, a system for controlling photovoltaic strings to perform Domino-type automatic snow melting provided in this embodiment further includes a power supply, and the power supply is connected to a photovoltaic power supply control module.

Specifically, in this embodiment, the photovoltaic power supply control module further includes a power interface in0, and the power supply uses a battery Y0.

Figure 12:
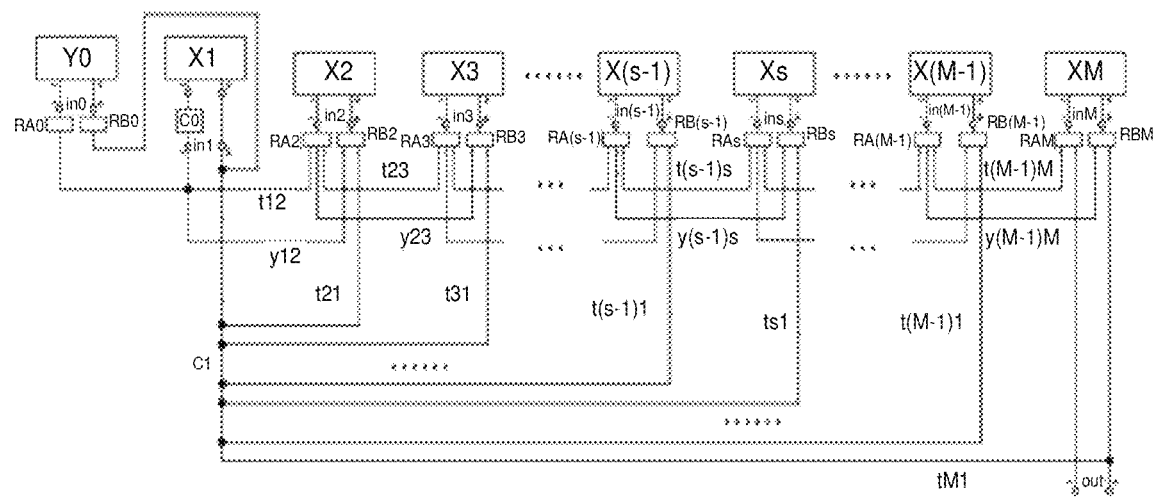
FIG. 12 shows a circuit diagram of the system shown in Embodiment 6.

As shown in FIG. 12, in this embodiment, the battery Y0 is connected to the photovoltaic power supply control module through the power interface in0, the $1^{st}$ polarity terminal of the power interface in0 is connected to the $1^{st}$ polarity terminal of the $1^{st}$ photovoltaic interface in1 through a switch RA0, and the $2^{nd}$ polarity terminal of the power interface in0 is connected to the $2^{nd}$ polarity terminal of the $1^{st}$ photovoltaic interface in1 through a switch RB0.

In this way, in this embodiment, in Work State II, the photovoltaic power supply control module switches the $1^{st}$ photovoltaic string X1 to the load mode by turning on the switches RA0 and RB0, and turning off the relays RA2 to RAM and the relays RB2 to RBM. The battery Y0 supply power to the $1^{st}$ photovoltaic string X1 to make it generate heat and melt snow.

In this embodiment, in Work State I and Work State II, in response to any one of the $2^{nd}$ photovoltaic string to the $M^{th}$ photovoltaic string being in the load mode, the switches RA0 and RB0 are both turned off. In this embodiment, in Work State II, in response to any one of the $2^{nd}$ photovoltaic string to the $M^{th}$ photovoltaic string being in the load mode, the working methods of the system in this embodiment is exactly the same as that in Embodiment 3; in Work State I, the working methods of the system described in this embodiment is exactly the same as that in Embodiment 3. In this way, in this embodiment, an automatic heating and snow melting of the $1^{st}$ photovoltaic string may be achieved by providing the battery Y0, which provides the initial power for the system to enter Work State II.

In this embodiment, the photovoltaic panels in the $1^{st}$ photovoltaic string to the $M^{th}$ photovoltaic string are all installed on the inclined plane A, and the battery connected through a power interface provides the initial power supply for the $1^{st}$ photovoltaic string to the $M^{th}$ photovoltaic string for snow melting.

In the specific implementation, in this embodiment, a mains supply may also be connected to the power interface instead of the battery to provide the initial power supply for the $1^{st}$ photovoltaic string to the $M^{th}$ photovoltaic string for snow melting.

Embodiment 7

Compared with Embodiment 5, a photovoltaic power supply control module in a system for controlling photovoltaic strings to perform Domino-type automatic snow melting provided in this embodiment further includes a power interface in0, a relay SB0 and a relay SA1. The system for controlling photovoltaic strings to perform Domino-type automatic snow melting in this embodiment further includes a battery Y0 as a power supply. The embodiment further includes a series line d0, a reverse line d11 and a reverse line dM0.

Figure 13:
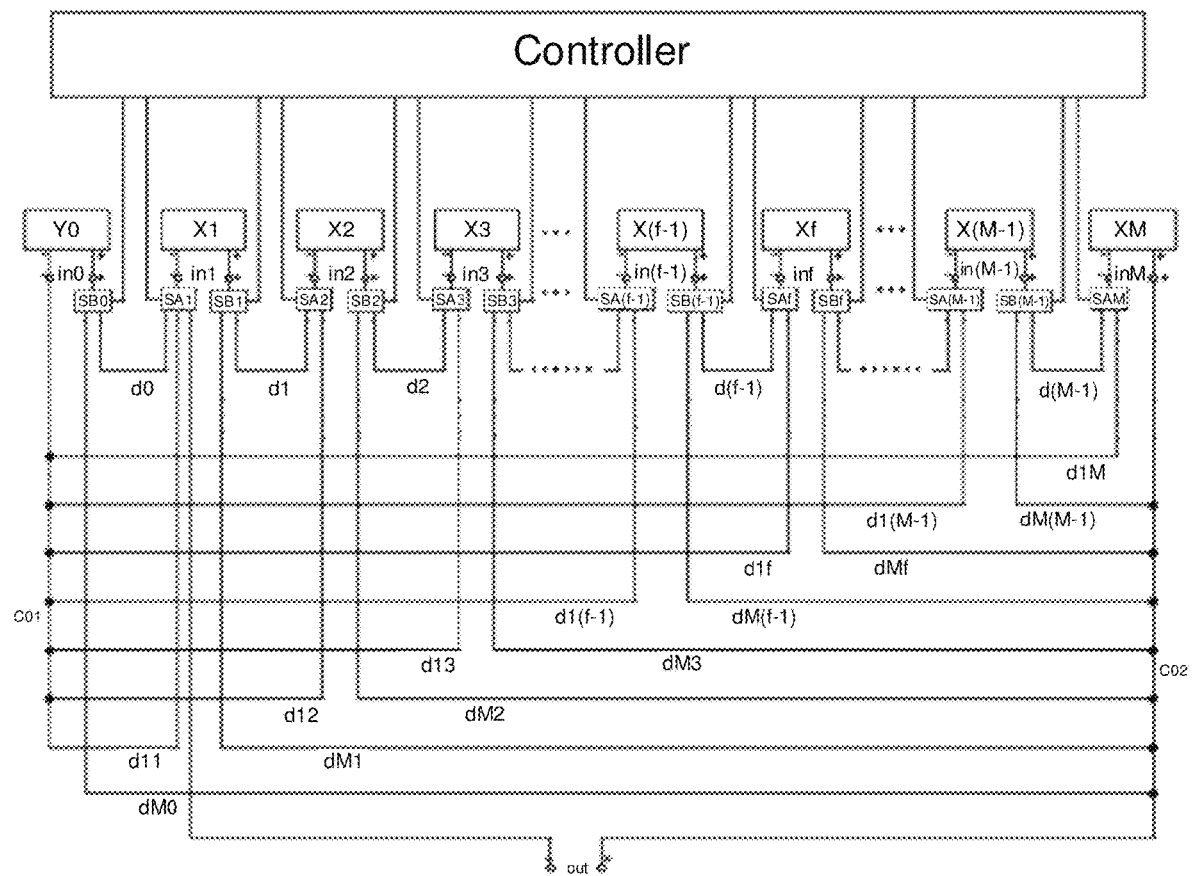
FIG. 13 shows a circuit diagram of the system shown in Embodiment 7.

As shown in FIG. 13, in this embodiment, the $1^{st}$ node C01 is equipotentially connected to the $1^{st}$ polarity terminal of the power interface in0. In this embodiment, the $2^{nd}$ polarity terminal of the power interface in0 is respectively connected to the $1^{st}$ end of the series circuit d0 and the $1^{st}$ end of the reverse line dM0 through the relay SB0, and a $2^{nd}$ end of the reverse line dM0 is connected to the $2^{nd}$ node; the $1^{st}$ polarity terminal of the $1^{st}$ photovoltaic string is respectively connected to the $2^{nd}$ end of the series line d0, the $1^{st}$ end of the reverse line d11 and the $1^{st}$ polarity terminal of the power supply output terminal out through the relay SA1, and the $2^{nd}$ end of the reverse line d11 is connected to the $1^{st}$ node, specifically, the relay SA1 is connected to the $1^{st}$ polarity terminal of the power supply output terminal out through the line d100.

In this way, in this embodiment, in Work State I, the controller controls the relays SA1 to SAM and the relays SB1 to SB(M−1) to turn on the line d100 and series lines d1 to d(M−1), so that the $1^{st}$ photovoltaic string to the $M^{th}$ photovoltaic string supply power to an external load connected to the power supply output terminal out.

In this embodiment, in Work State II,
when the reverse lines d11, dM0 and dM1 are turned on, the $1^{st}$ photovoltaic string X1 as a load is reversely powered by the battery Y0 as a power supply;
when reverse lines d12, dM2 and dM1 and the series line d0 are turned on, the $2^{nd}$ photovoltaic string X2 as a load is reversely powered by the battery Y0 and the $1^{st}$ photovoltaic string as a power supply;
when reverse lines d13, dM3 and dM2 and the series lines d0 and d1 are turned on, the $3^{rd}$ photovoltaic string X3 as a load is reversely powered by the battery Y0, the $1^{st}$ photovoltaic string X1 and the $2^{nd}$ photovoltaic string X2 as a power supply;
when reverse lines d1f, dMf and dM(f−1) and series lines d0, d1, d2 . . . d(f−2) are all turned on, the $f^{th}$ photovoltaic string Xf as a load is reversely powered by the battery Y0 and the $1^{st}$ to the $(f−1)^{th}$ photovoltaic strings as a power supply; specifically, at this time, the $1^{st}$ polarity terminal of the $f^{th}$ photovoltaic string Xf is connected to the $1^{st}$ node through the reverse line d1f, the $2^{nd}$ polarity terminal of the $f^{th}$ photovoltaic string Xf is turned on with the $2^{nd}$ polarity terminal of the $(f-1)^{th}$ photovoltaic string X(f-1) through the reverse lines dMf and dM(f-1). At the same time, the series lines d0, d1, d2 ... d(f-2) are all turned on, so that the $1^{st}$ to the $(f-1)^{th}$ photovoltaic strings are connected in series; $2 \leq f \leq M-1$; and when reverse lines d1M and dM(M-1) and series lines d0, d1, d2 ... d(M-2) are turned on, the $M^{th}$ photovoltaic string as a load is reversely powered by the battery Y0 and the $1^{st}$ to the $(M-1)^{th}$ photovoltaic strings X(M-1) as a power supply.

In this embodiment, when power is supplied to the external load, the battery Y0 stops working; when power is supplied to any photovoltaic string, the battery Y0 enters the power supply network, thereby improving the heating and snow melting efficiency of the photovoltaic string.

The above-mentioned Embodiment 6 and Embodiment 7 use the photovoltaic power supply control module described in Embodiment 2. Specifically, in Embodiment 6 and Embodiment 7, the photovoltaic panels in the $1^{st}$ photovoltaic string to the $M^{th}$ photovoltaic string are all installed on the same inclined plane A. All photovoltaic panels on the inclined plane A are arranged in a matrix, and in a row of photovoltaic panels in an inclined direction of the inclined plane A, the serial number of a photovoltaic string in which a photovoltaic panel is located lower is less than the serial number of a photovoltaic string in which a photovoltaic panel is located higher.

Specifically, the photovoltaic power supply control module provided in the present disclosure is used to divide photovoltaic panels in a photovoltaic system into M photovoltaic strings when melting snow for the photovoltaic system, so that a sub-regional sequential snow melting of the photovoltaic system is achieved to improve the snow melting efficiency, and the off-grid self-power supply during a snow melting process is achieved. In the present disclosure, the value of M may be set according to the parameters of photovoltaic panels in the photovoltaic system and snow melting efficiency requirements. Specifically, the minimum value of M may be 2, and the maximum value of M may be the total number of photovoltaic panels in the photovoltaic system. When the value of M is the total number of photovoltaic panels in the photovoltaic system, in Embodiment 3 to Embodiment 7, each photovoltaic string includes at least one photovoltaic panel.

In the specific application of the present disclosure, the value of M may be set according to the following constraints:

$SM = \sum_{i=1}^{M} w_i$, and $w_M > w_{M-1} > \ldots > w_3 > w_2$, where SM is the total number of photovoltaic panels in the photovoltaic system, and $W_i$ is the number of photovoltaic panels in the $i^{th}$ photovoltaic string Xi.

In Embodiment 7, $w_M > w_{M-1} > \ldots > w_3 > w_2 > w_1$ may be further set. In this way, the number of photovoltaic panels in the $1^{st}$ photovoltaic string to the $M^{th}$ photovoltaic string increase sequentially, which is beneficial to increase the power supply in Work State II, so as to improve the snow melting efficiency.

The present disclosure provides a system for controlling photovoltaic strings to perform Domino-type automatic snow melting. Based on a principle that a photovoltaic string may consume electric energy and generate heat when being reversely powered, the photovoltaic string is reversely powered to melt snow covered on the photovoltaic string.

In the present disclosure, an $(n+1)^{th}$ photovoltaic string is reversely powered through $1^{st}$ to $n^{th}$ photovoltaic strings, and the control of the heat generation in $(n+1)^{th}$ photovoltaic string is achieved, so snow on the $(n+1)^{th}$ photovoltaic string is melted. In this way, the electricity self-supply for heat generation is achieved in off-grid during the snow is being melted.

In the present disclosure, in the process of supplying reverse power to the $2^{nd}$ photovoltaic string to the $M^{th}$ photovoltaic string, the supplied power for reverse power supply gradually increases due to an increase in the number of photovoltaic strings used for power generation, so that the heating power increases, which is beneficial to improve the snow melting efficiency.

In the present disclosure, the controller controls the switching of the working states of the photovoltaic power supply control module, and an automatic control of heating each photovoltaic string in the system is achieved, so that an automatic control and automatic power supply of snow melting on the photovoltaic string are achieved, which is beneficial to ensure the continuity and reliability of photovoltaic power supply in snowy weather.

The present disclosure provides a system for controlling photovoltaic strings to perform Domino-type automatic snow melting. In Work State II of the photovoltaic power supply control module, a switching of the photovoltaic string in the load mode may cause photovoltaic strings that have completed snow melting to gradually supply reverse power to photovoltaic strings that have not been snow melting. By gradually increasing the power supply, the Domino effect is implemented, which is beneficial to improve the snow melting efficiency and reduce the snow melting time. The present disclosure is particularly beneficial to prolong the working time and improve the power generation efficiency of rooftop photovoltaic system in snowy season. The present disclosure may also be used for large-scale ground centralized photovoltaic power plants.

The above are only the preferred specific embodiments involved in the present disclosure. However, the scope of protection of the present disclosure is not limited thereto. Within the technical scope disclosed in the present disclosure, any equivalent replacements or changes made by those skilled in the art based on the technical solutions and application concepts of the present disclosure shall be included within the scope of protection of the present disclosure.

What is claimed is:

1. A system for controlling photovoltaic strings to perform Domino-type automatic snow melting, comprising a controller, M photovoltaic strings and a photovoltaic power supply control module; wherein the photovoltaic power supply control module comprises M photovoltaic interfaces; the M photovoltaic strings are correspondingly connected to the M photovoltaic interfaces; wherein, the photovoltaic power supply control module comprises at least Work State I and Work State II:

in Work State I, $1^{st}$ to $M^{th}$ photovoltaic strings are all in a power supply mode, and supply power to an external load;

in Work State II, $1^{st}$ to $(k-1)^{th}$ photovoltaic strings are all in a power supply mode in response to a $k^{th}$ photovoltaic string being in a load mode, and the $1^{st}$ to $(k-1)^{th}$ photovoltaic strings supply power to the $k^{th}$ photovoltaic string, $2 \leq k \leq M$; and the controller is connected to the photovoltaic power supply control module, and is configured to control the working state of a photovoltaic power supply control module, wherein in Work State II of the photovoltaic power supply control module, $2^{nd}$ to $M^{th}$ photovoltaic strings execute the load mode sequentially, wherein a photovoltaic panel included in the $2^{nd}$ photovoltaic string to the $M^{th}$ photovoltaic string are all installed on the same inclined plane A, wherein a photovoltaic panel included in the $1^{st}$ photovoltaic string is installed perpendicular to a ground.

2. The system according to claim 1, wherein in Work State I of the photovoltaic power supply control module, the $1^{st}$ to $M^{th}$ photovoltaic strings are connected in series; in Work State II of the photovoltaic power supply control module, the $1^{st}$ to $(k-1)^{th}$ photovoltaic strings are connected in series, in response to the photovoltaic string connected to the $k^{th}$ photovoltaic interface being in the load mode.

3. The system according to claim 1, wherein the number of photovoltaic panels included in the $2^{nd}$ photovoltaic string to the $M^{th}$ photovoltaic string increases sequentially.

4. The system according to claim 1, wherein all photovoltaic panels on the inclined plane A are arranged in a matrix; and in a row of the photovoltaic panels in an inclined direction of the inclined plane A, a serial number of a photovoltaic string in which a photovoltaic panel is located lower is less than a serial number of a photovoltaic string in which a photovoltaic panel is located higher.

5. The system according to claim 1, further comprising a power supply; wherein the power supply is connected to the photovoltaic power supply control module; in Work State II of the photovoltaic power supply control module, the power supply supplies power to the $1^{st}$ photovoltaic string, in response to the $1^{st}$ photovoltaic string being in the load mode.

6. The system according to claim 5, wherein in Work State II of the photovoltaic power supply control module, the $1^{st}$ to $M^{th}$ photovoltaic strings execute the load mode sequentially.

7. The system according to claim 6, wherein the power supply and the $1^{st}$ to $(k-1)^{th}$ photovoltaic strings all supply power to the $k^{th}$ photovoltaic string, in response to the $k^{th}$ photovoltaic string being in the load mode, $2 \leq k \leq M$.

8. The system according to claim 6, wherein the number of photovoltaic panels included in the $1^{st}$ photovoltaic string to the $M^{th}$ photovoltaic string increases sequentially.

* * * * *